US009444292B2

(12) United States Patent
Tamamura et al.

(10) Patent No.: US 9,444,292 B2
(45) Date of Patent: Sep. 13, 2016

(54) ELECTRIC MOTOR AND COMPRESSOR WITH SAME

(71) Applicant: Panasonic Corporation, Kadoma-shi, Osaka (JP)

(72) Inventors: Toshiyuki Tamamura, Shiga (JP); Ikuo Ozaki, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 158 days.

(21) Appl. No.: 14/264,752

(22) Filed: Apr. 29, 2014

(65) Prior Publication Data

US 2014/0348673 A1    Nov. 27, 2014

(30) Foreign Application Priority Data

May 24, 2013  (JP) ................................. 2013-109502

(51) Int. Cl.
| | |
|---|---|
| *H02K 1/16* | (2006.01) |
| *H02K 3/34* | (2006.01) |
| *H02K 21/14* | (2006.01) |
| *H02K 29/03* | (2006.01) |
| *H02K 1/27* | (2006.01) |

(52) U.S. Cl.
CPC .............. *H02K 1/165* (2013.01); *H02K 3/345* (2013.01); *H02K 1/276* (2013.01); *H02K 21/14* (2013.01); *H02K 29/03* (2013.01); *H02K 2213/03* (2013.01)

(58) Field of Classification Search
CPC ............ H02K 1/12; H02K 1/14; H02K 1/16; H02K 1/18; H02K 1/28; F04D 25/06; Y10T 29/49009

USPC .................... 310/216.069–216.074
See application file for complete search history.

(56) References Cited

U.S. PATENT DOCUMENTS

| | | | | |
|---|---|---|---|---|
| 3,886,256 A | * | 5/1975 | Ohuchi ..................... | H02K 1/16 310/216.043 |
| 6,664,703 B2 | * | 12/2003 | Oketani ................. | H02K 3/345 29/596 |
| 2008/0179985 A1 | * | 7/2008 | Miyaji ..................... | H02K 1/16 310/216.048 |
| 2013/0342070 A1 | | 12/2013 | Ogawa et al. | |

FOREIGN PATENT DOCUMENTS

| | | |
|---|---|---|
| JP | 8-107642 | 4/1996 |
| JP | 2012023818 A * | 2/2012 |
| TW | 201244330 | 11/2012 |
| WO | 2012/120577 | 9/2012 |

OTHER PUBLICATIONS

English Translation of Chinese Search Report dated Mar. 2, 2016 for the related Chinese Patent Application No. 201410222705.8.

\* cited by examiner

*Primary Examiner* — Tran Nguyen
(74) *Attorney, Agent, or Firm* — Hamre, Schumann, Mueller & Larson, P.C.

(57) ABSTRACT

An electric motor according to the present invention includes stator (10) which has ring-shaped yoke (11) and a plurality of teeth (12) disposed at the inner peripheral part of yoke (11). Yoke (11) and teeth (12) configure slots (13) in which windings (15) are wound via electric insulator (14). Moreover, the motor includes rotor (20) that is rotatably held and faces the inner periphery of stator (10) via a slight gap. The rotor includes rotor iron core (21) having permanent magnets (22) that are disposed in the inside or on the surface of the core. Furthermore, a plurality of yoke recesses (16) is disposed only in the yoke (11) parts of slots (13).

10 Claims, 3 Drawing Sheets

ELECTRIC MOTOR AND COMPRESSOR WITH SAME

TECHNICAL FIELD

The present invention relates to electric motors having a reduced leakage current and a high efficiency, and to compressors equipped with the motors.

BACKGROUND ART

An electric motor is provided with windings which are wound in slot parts configured with teeth and a yoke, via electric insulator having a high dielectric constant. This configuration allows a leakage current to flow between the slot parts grounded and the windings subjected to an electric voltage.

Conventionally, a reciprocating compressor equipped with an electric motor of this type has been configured in the following manner, as disclosed in Japanese Patent Unexamined Publication No. H08-107642. That is, the motor has the slots configured with the teeth and the yoke. The whole of the inside surfaces of the slots are provided with a plurality of fine asperities. The plurality of the fine asperities yields gaps having a low dielectric constant, which allows a reduced leakage current.

However, the presence of a plurality of such the recesses in portions where a magnetic flux density is high, especially in the teeth portions, causes an increase in iron loss and a decrease in torque constant due to saturation of the magnetic flux, which results in a reduced efficiency of the electric motor. This has been a problem.

SUMMARY OF THE INVENTION

An electric motor according to the present invention includes a stator which has a ring-shaped yoke and a plurality of teeth disposed at an inner peripheral part of the yoke. The yoke and teeth configure slot parts in which windings are wound via electric insulator. Moreover, the motor includes a rotor that is rotatably held and faces the inner periphery of the stator via a slight gap. The rotor includes a rotor iron core having permanent magnets that are disposed in the inside or on the surface of the core. In addition, a plurality of recesses is disposed only in yoke parts of the slots.

With this configuration, the electric motor according to the present invention allows a reduced leakage current and an improved efficiency.

DESCRIPTION OF EMBODIMENTS

Hereinafter, embodiments of the present invention will be described with reference to the accompanying drawings. It is noted, however, that the present invention is not limited to the embodiments.

First Exemplary Embodiment

Figure 1:
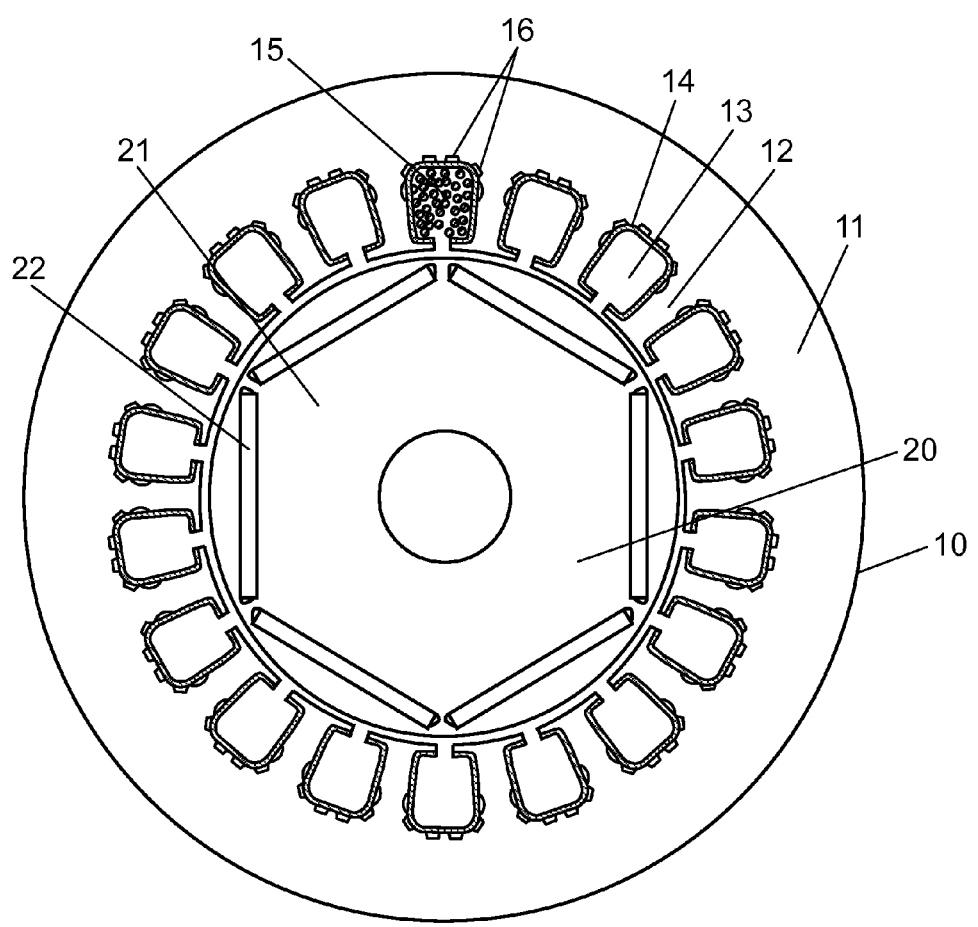
FIG. 1 is a radial cross-sectional view of an electric motor according to a first embodiment of the present invention.

FIG. 1 is a radial cross-sectional view of an electric motor according to a first embodiment of the present invention. The electric motor is configured with stator 10 and rotor 20. Rotor 20 is rotatably held, facing the inner periphery of stator 10 via a slight gap. The rotor includes rotor iron core 21 having permanent magnets 22 that are disposed in the inside of the core.

Stator 10 includes ring-shaped yoke 11 and a plurality of teeth 12 that is disposed at an inner peripheral part of yoke 11. Yoke 11 and teeth 12 configure slots 13 in which windings 15 are wound via electric insulator 14. In a yoke part of each of slots 13, a plurality of yoke recesses 16 is disposed.

When the depth of yoke recesses 16 is small, voids having a low dielectric constant become smaller in size, resulting in the smaller effect of reducing a leakage current. For this reason, the depth of yoke recesses 16 is set to be approximately larger than the thickness of the electric insulator, which securely forms the voids having the low dielectric constant.

Figure 2:
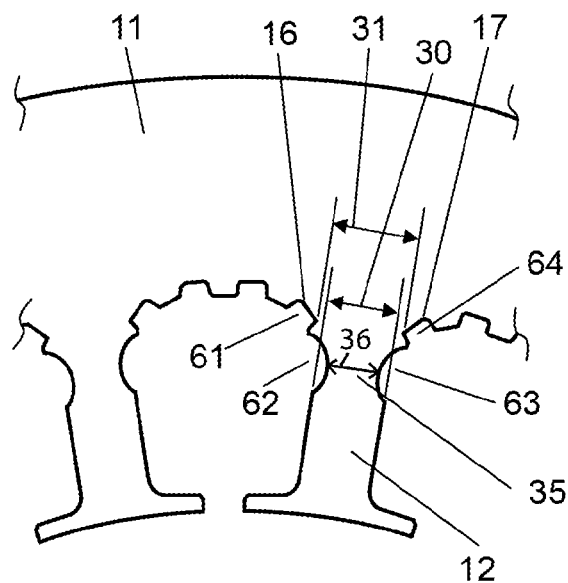
FIG. 2 is an enlarged cross-sectional view of teeth of the electric motor according to the first embodiment of the invention.

FIG. 2 is an enlarged cross-sectional view of a portion of the slots. For each one of teeth 12, one narrow part 35 of the tooth is disposed, i.e. one for the each. Shortest distance 31 defined between yoke recesses 16 and 17, which are adjacent to each other and interpose one of teeth 12 therebetween, is set to be larger than tooth width 30 of the tooth exclusive of narrow part 35.

It is noted that the presence of narrow part 35 in a portion of each of teeth 12 allows a reduction in harmonic iron loss. However, if shortest distance 31 between yoke recesses 16 and 17 adjacent to each other is set to be smaller than tooth width 30, it results in the multiple umber of the narrow parts. Unfortunately, the presence of such the multiple narrow parts causes an increase in magnetic flux density at the multiple portions of the each of teeth 12, which results in an increase in fundamental-wave iron loss, leading to a reduced efficiency of the electric motor. The recesses in FIG. 2 include first, second, third, and fourth recesses 61-64. The first recess 61 and the second recess 62 are adjacent to each other. The second recess 62 and the third recess 63 are adjacent to each other across one of the teeth 12. The third recess 63 and the fourth recess 64 are adjacent to each other. The second recess 62 is spaced away from the third recess 63 by a distance 36 (which corresponds to a first distance). The first recess 61 is spaced away from the fourth recess 64 by the distance 31 (which corresponds to a second distance). The distance 36 is smaller than the tooth width 30. The distance 31 is larger than the tooth width 30.

Consequently, in the embodiment, shortest distance 31 between yoke recesses 16 and 17 adjacent to each other is configured to be larger than tooth width 30 of the tooth exclusive of narrow part 35, which restricts the number of narrow part 35 to one. This configuration makes it possible to reduce the harmonic iron loss without increasing the fundamental-wave iron loss, and also to reduce the leakage current.

Figure 3:
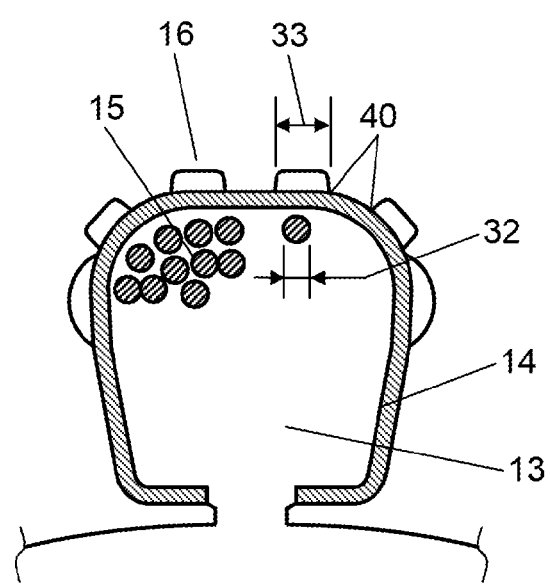
FIG. 3 is an enlarged cross-sectional view of a slot of the electric motor according to the first embodiment of the invention.

FIG. 3 is a detailed view of one of the slot parts. Recess width 33 of yoke recesses 16 is configured to be larger than winding-wire diameter 32 of windings 15. This configuration allows an increase in the number of windings 15 facing yoke recesses 16 via electric insulator 14, which, in turn, reduces the number of windings 15 in contact with slots 13 via electric insulator 14. This leads to the increased effect of reducing the leakage current.

Moreover, at parts of yoke recesses 16 where the parts are in contact with electric insulator 14, round-chamfered corners 40 are formed. This configuration results in an enlargement in size of the voids having the low dielectric constant, which allows the increased effect of reducing the leakage current. Moreover, the configuration allows the prevention of the electric insulator from being torn during the winding process. Note, however, that tapered corners instead of round-chamfered corners 40 may be employed, which brings about the same advantages.

Second Exemplary Embodiment

Figure 4:
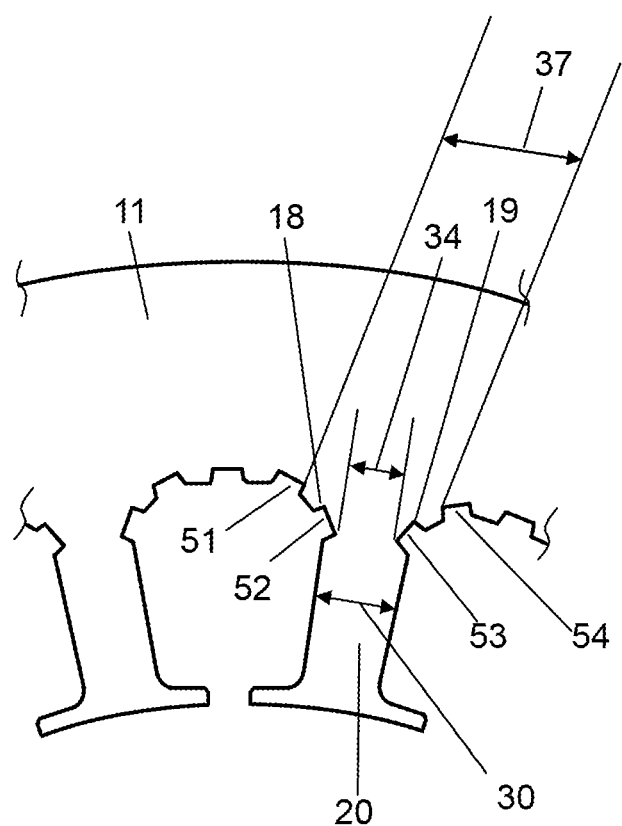
FIG. 4 is an enlarged cross-sectional view of teeth of an electric motor according to a second embodiment of the present invention.

FIG. 4 is an enlarged view of a slot part of an electric motor according to a second embodiment of the present invention. Shortest distance 34 defined between yoke recesses 18 and 19, which are adjacent to each other and interpose one of teeth 20 therebetween, is set to be smaller than tooth width 30. That is, shortest distance 34 corresponds to narrow part 35 of the first embodiment. The recesses in FIG. 4 include first, second, third, and fourth (yoke) recesses 51-54. The first recess 51 and the second recess 52 are adjacent to each other. The second recess 52 and the third recess 53 are adjacent to each other across one of the teeth 20. The third recess 53 and the fourth recess 54 are adjacent to each other. The second recess 52 is spaced away from the third recess 53 by a distance 34 (which corresponds to a first distance, and a first shortest distance). The first recess 51 is spaced away from the fourth recess 54 by the distance 37 (which corresponds to a second distance, and a second shortest distance). The distance 34 is smaller than the tooth width 30. The distance 37 is larger than the tooth width 30. In the same manner as the first embodiment, the configuration allows a reduction in the harmonic iron loss, an improvement of the efficiency without increasing the fundamental-wave iron loss, and a reduction in the leakage current.

Note that, in the first and second embodiments described above, when the windings of stator 10 are formed by a distributed winding method, it means an increase in the number of windings 15 in contact with slots 13 via electric insulator 14, which causes a larger leakage current. In this case, however, with the configurations according to the embodiments of the present invention, it is possible to more effectively exhibit the effect of reducing the leakage current.

Moreover, when the electric motor is driven by a PWM method, it causes a larger harmonic iron loss. In this case, however, with the configurations according to the embodiments of the present invention, it is possible to more effectively exhibit the effect of reducing the harmonic iron loss.

Note that, when permanent magnets 22 are rare-earth magnets, the magnetic flux densities of teeth 12 and 20 become higher to increase the ratio of iron loss to the others. Therefore, with the configurations according to the embodiments of the present invention, it is possible to more effectively exhibit the effect of improving the efficiency by reducing the harmonic iron loss.

As described above, the electric motor according to present invention includes the stator which has the ring-shaped yoke and the plurality of the teeth disposed at the inner peripheral part of the yoke. The yoke and teeth configure the slots in which the windings are wound via the electric insulator. Moreover, the motor includes the rotor that is rotatably held and faces the inner periphery of the stator via the slight gap. The rotor includes the rotor iron core having the permanent magnets that are disposed in the inside or on the surface of the core. In addition, the plurality of the recesses is disposed only in the yoke parts of the slots, thereby allowing the reduction in the leakage current.

Moreover, the configuration is preferably such that each of the teeth has a narrow part, and that the shortest distance, which is defined between the adjacent yoke recesses interposing the each of the teeth therebetween, is larger than the tooth distance of the tooth exclusive of the narrow part. Alternatively, the shortest distance, which is defined between the adjacent yoke recesses interposing the each of the teeth therebetween, may be smaller than the tooth width such that the portion of the shortest distance services as the narrow part.

Furthermore, the width of the yoke recesses is preferably larger than the winding-wire diameter. Corner parts of the yoke recesses are preferably round-chamfered where the corner parts are in contact with the electric insulator. In addition, in the case where the windings are formed by a distributed winding method and/or the driving is performed by a PWM method, the configurations according to the embodiments are able to exhibit the advantages more effectively.

INDUSTRIAL APPLICABILITY

As described above, since the electric motor according to the present invention is capable of increasing the efficiency as well as reducing the leakage current, it is applicable to electric compressors and other devices.

REFERENCE MARKS IN THE DRAWINGS 10 stator
11 yoke
12, 20 teeth
13 slot
14 electric insulator
15 winding
16, 17, 18, 19 yoke recess
20 rotor
21 rotor iron core
22 permanent magnet
30 tooth width
31 shortest distance
32 winding-wire diameter
33 recess width
34 shortest distance
35 narrow part
40 round-chamfered corner

The invention claimed is:
1. An electric motor comprising:
 a stator including:
  a ring-shaped yoke; and
  a plurality of teeth disposed at an inner peripheral part of the yoke, the yoke and the teeth configuring slots in which windings are disposed via electric insulator; and
 a rotor being rotatably held, facing an inner periphery of the stator via a gap, and including a rotor iron core having a permanent magnet disposed at one of an inside and a surface of the core, wherein a plurality of yoke recesses are disposed only in yoke parts of the slots, each of the teeth has a narrow part, and a shortest distance between an adjacent two of the yoke recesses across each of the teeth is larger than a tooth width of the each of the teeth exclusive of the narrow part to reduce a harmonic iron loss and a leakage current.

2. The electric motor according to claim 1, wherein a width of each of the yoke recesses is larger than a wire diameter of the windings.

3. The electric motor according to claim 1, wherein a part of each of the yoke recesses in contact with the electric insulator is round-chamfered.

4. The electric motor according to claim 1, wherein the windings of the stator are wound by a distributed winding method.

5. The electric motor of claim 1 being driven by a pulse width modulation (PWM) method.

6. A compressor comprising the electric motor according to claim 1.

7. An electric motor comprising:

a stator including:
   a ring-shaped yoke; and
   a plurality of teeth disposed at an inner peripheral part of the yoke, the yoke and the teeth configuring slots in which windings are disposed via electric insulator; and a rotor being rotatably held, facing an inner periphery of the stator via a gap, and including a rotor iron core having a permanent magnet disposed at one of an inside and a surface of the core, wherein a plurality of yoke recesses are disposed in yoke parts of each of the slots, the plurality of yoke recesses include first, second, third, and fourth yoke recesses, the first and second yoke recesses being adjacent to each other, the second and third yoke recesses being adjacent to each other across one of the teeth, the third and fourth yoke recesses being adjacent to each other, the second yoke recess being spaced away from the third yoke recess by a first shortest distance, and the first yoke recess being spaced away from the fourth yoke recess by a second shortest distance, and the first shortest distance is smaller than a tooth width of the one of the teeth and the second shortest distance is larger than the tooth width to reduce a harmonic iron loss and a leakage current.

8. A compressor comprising the electric motor according to claim 7.

9. An electric motor comprising:

a stator including:
   a ring-shaped yoke; and
   a plurality of teeth disposed at an inner peripheral part of the yoke, the yoke and the teeth configuring slots in which windings are disposed via electric insulator; and a rotor being rotatably held, facing an inner periphery of the stator via a gap, and including a rotor iron core having a permanent magnet disposed at one of an inside and a surface of the core, wherein a plurality of recesses are disposed at each of the slots, the plurality of recesses include first, second, third, and fourth recesses, the first and second recesses being adjacent to each other, the second and third recesses being adjacent to each other across one of the teeth, the third and fourth recesses being adjacent to each other, the second recess being spaced away from the third recess by a first distance, and the first recess being spaced away from the fourth recess by a second distance, and the first distance is smaller than a tooth width of the one of the teeth and the second distance is larger than the tooth width.

10. A compressor comprising the electric motor according to claim 9.

* * * * *